United States Patent Office 2,912,315
Patented Nov. 10, 1959

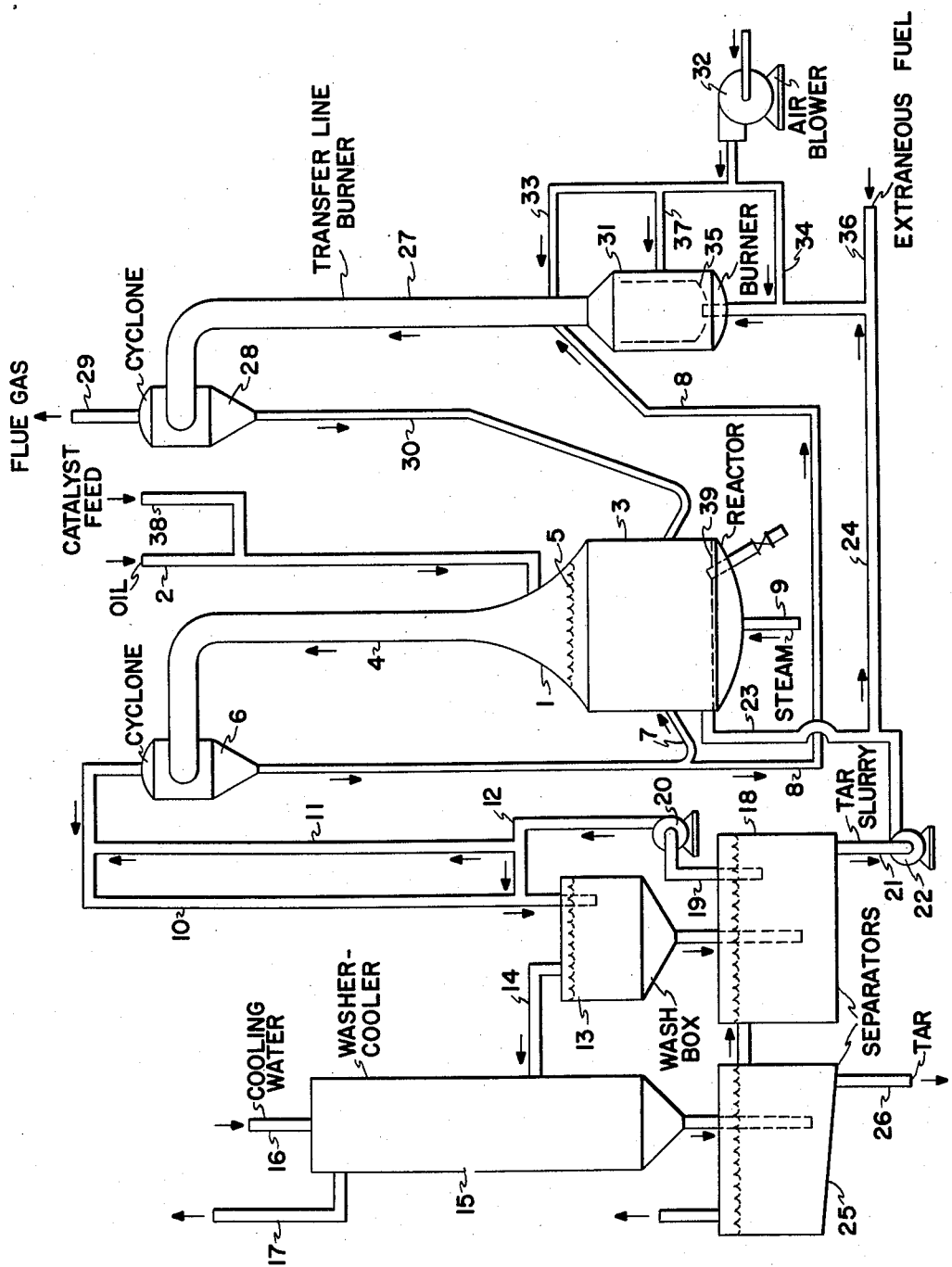

2,912,315

FLUIDIZED SOLIDS TOWN GAS MANUFACTURING PROCESS

Roy E. D. Haney, Westfield, N.J., assignor to Esso Research and Engineering Company, a corporation of Delaware Application October 10, 1956, Serial No. 615,098

7 Claims. (Cl. 48—214)

This invention relates to a fluidized solids process for the manufacture of a gas comprising hydrogen and carbon monoxide from hydrocarbon oils. This invention proposes to produce by a novel process a low B.t.u. heating or town gas from heavy oils by high temperature pyrolysis using heat-carrying solids, either catalytic or non-catalytic.

In brief compass this invention proposes a conversion process for manufacturing a gas comprising hydrogen and carbon monoxide and having a heating value in the range of 450–550 B.t.u./cu.ft., in a single reaction zone at a rate greater than 10,000 M s.c.f./day, which comprises maintaining in the lower portion of the reaction zone at a gasification temperature in the range of 1500–1800° F., a dense turbulent bed of fluidizing solids having a defined upper level and a density 20 to 40% of the true density of the solids, continuously adding to the bed heated solids having a temperature in the range of 1700–1900° F. to maintain the gasification temperature, maintaining a total superficial fluidizing gas velocity in the bed in the range of 0.5 to 5 ft./sec. by fluidizing with steam preheated to a temperature above 250° F., injecting and converting a heavy tar in the bed, flowing vertically upwardly gasiform products along with entrained solids from the bed without appreciable cooling, injecting a heavy oil feed at a rate in the range of 0.1 to 0.4 lbs./min./cu.ft. of the bed into the gasiform products near the upper level, flowing the resulting suspension at a velocity in the range of 25 to 60 ft./sec. and a density 5 to 15% the density of the bed to a separating zone, separating entrained solids from the gasiform products in the separating zone in less than 0.7 second from the time of injection of the heavy oil feed, returning a portion of the solids so separated to the bed, reheating the remainder to supply the heated solids, quenching the gasiform products with water to a temperature below 250° F. to remove therefrom as a slurry a heavy tar and finely divided solids, returning a portion of the slurry to the fluid bed and finally scrubbing with water the quenched gasiform products to remove light tars.

There has been a desideratum for an economic process, particularly in European countries, capable of converting heavy hydrocarbon oils to combustible gases of suitable heating value and density. It has previously been proposed to convert at high temperatures, either catalytically or non-catalytically, oils to gases through contact with heat-carrying solids which may be in the form of fixed or fluidized beds. Most of the prior processes proposed, however, have suffered from one or more undesirable limitations, for example, the operability, capacity, yields, conversion and the like of the proposed processes have made them unattractive.

The present invention proposes a continuous high capacity, efficient process requiring only a single reactor for making a synthesis, manufactured or town gas comprising hydrogen and carbon monoxide by high temperature pyrolytic conversion of hydrocarbon oils through contact with highly heated fluidized solids. While particularly suitable for the elimination of heavy low value oils, such as petroleum residua, asphalt tars, shale oils, etc., the presently proposed process is also capable of converting lighter distillate oils such as gas oils, naphthas, diesel oils and the like.

In this new process, an oil is cracked or converted and the cracked products are partly reformed with steam in the presence of heated particulate solids, preferably catalystic, in a transfer line zone, i.e., wherein the reactants move at high lineal velocities. The transfer line zone surmounts an enlarged fluid bed zone. In this fluid bed zone, the coke formed by the cracking reaction is gasified by steam, the unconverted steam and gasification products passing up through the transfer line zone. The amount of solids in the transfer line zone is controlled by the amount of entrainment from this fluid bed. Heat for the endothermic water gas and cracking reactions is supplied by burning a portion of the coke or carbon produced in a transfer line burning zone. Tar recovered from the product gases, or an extraneous fuel, may be supplied to the burning zone to maintain the process in heat balance.

After a limited contact time with the heated solids in the transfer line zone, the hot product gases have entrained solids removed and are quenched with water, thereby removing tar and any solids escaping through the solids separating system.

This novel process has many advantages over the previously proposed methods for making low B.t.u. gas. It has the advantage of fluidized operations, which advantages over fixed and gravitating bed operations are a matter of record. By surmounting a dense fluid gasification bed with a transfer line zone wherein a limited initial conversion of the feed can be obtained, certain definite advantages are secured. The coke-steam reaction is relatively slow compared to the hydrocarbon cracking reaction and to the reactions which are involved in steam reforming of hydrocarbons. When all of these reactions, cracking, reforming of the cracked products and coke gasification are carried out in a single zone such as in a single fluid bed, overcracking of the oil occurs if the temperature of the reaction zone is high enough for the water-gas reaction to proceed at a reasonable rate. On the other hand, by lowering the temperature to prevent overcracking, very little carbon gasification is accomplished. According to this invention, however, the necessary high temperature and long contact time for the gasification reaction is provided in the lower fluid bed portion of the reaction zone, and by maintaining a short contact time in the transfer line zone between the fresh oil feed and the hot solids, the relatively rapid hydrocarbon cracking reaction is prevented from completely degrading the feed to hydrogen and carbon.

Operation of the present process may be conducted either non-catalytically, or with the use of a permanent or expendable catalyst. Non-catalytic solids may comprise sand, metal and ceramic particles, spent catalyst and the like, but coke produced by the process is preferred. The solids may be catalytic and may comprise such materials as nickel, cobalt and molybdenum. Expendable catalysts such as lime or partially hydrated lime, dolomite; hydroxides, carbonates and bicarbonates of potassium and sodium, either in powder form or in water solution, may also be used and are preferred. The catalysts may be introduced with reactants to the process or separately therefrom.

The drawing attached to and forming part of this specification illustrates this invention.

Referring to this drawing, a residual oil which may be suitably preheated, is supplied to reaction zone 1 by line 2. The reactor comprises a lower expanded gasification zone 3 adapted to contain a fluidized bed of solids. This expanded zone merges into a vertically disposed transfer line reaction zone 4. The oil feed is injected, preferably through steam assisted atomization nozzles, into the transfer line zone just above the level 5 of the fluid bed of solids in the lower portion. The injected oil contacts gasification products and high temperature solids entrained in the gasification products emerging from the fluid bed. Upon contact with the entrained solids, the oil undergoes pyrolysis evolving vaporous conversion products and depositing coke on the solids. The conversion products and solids pass upwardly through the transfer line zone at velocities above 30 ft./sec. into a separating zone, e.g., a cyclone 6. The length of the transfer line zone is such that the average residence time of the conversion products from the point of injection of oil to the cyclone inlet is less than 0.7 second, preferably less than 0.4. Thus, under the high temperature conditions, preferably 1500°–1800° F., maintained in the transfer line, the degree of conversion of the oil is limited. For solids having a true density of about 80–120 lbs./cu. ft., the density of the solids suspension is preferably within the range of 0.5 to 5.0 lbs./cu. ft. The oil feed, when a residual oil is used, is injected at a rate preferably of 0.005 to 0.02 lb./lb. of entrained solids. While the gasification bed is preferably operated at 1500–1800° F., there will be some drop in temperature through the transfer line. It is preferred, however, to maintain this temperature drop to the cyclone inlet below 100° F.

At the high temperatures prevailing in the transfer line zone, unconverted steam from the gasification zone serves to reform the light conversion products and to further gasify the coke on the solids in the zone. It is preferred to maintain the initial steam content of the suspension in the range of 20 to 40 vol. percent on a solids-free basis.

The entrained solids are separated from the conversion products in cyclone 6 and are recycled by line 7 to the gasification zone or are passed by line 8 to the reheating zone. Normally about 50 to 80 wt. percent of the recovered solids will be returned directly to the gasification zone. In the gasification zone, the solids are maintained as a fluid bed in a manner well known by the art. Steam, preferably preheated to a temperature above 250° F., supplied by line 9, is used to fluidize the bed of solids. The steam is evenly distributed throughout the bed by a grid 39 which supports the bed. With residual oil feed, about 60 to 100 lbs. of steam/lb. of fresh feed will be injected into the gasification zone 3. The superficial velocity of ascending gases in the fluid bed is maintained within the range of preferably 0.5 to 5 ft./sec. The temperature of the fluid bed, 1500–1800° F., and the depth are sufficient to permit substantial gasification of the coke on the solids in the zone. About 95 wt. percent of the solids range in size from 75 to 300 microns, and average about 150 to 200 microns. About 40 to 70 wt. percent of the injected steam will be converted to hydrogen and carbon oxides in the gasification zone.

The conversion products are removed overhead from cyclone 6 by line 10, and are preferably immediately quenched with water, supplied by lines 11 and 12, to a temperature below about 225° F. The quenched gases enter washbox 13. From the washbox they pass by line 14 to a washing and cooling tower 15, water being supplied to the top of the tower by line 16. The cooled and scrubbed gases are removed from the upper portion of the washer-cooler by line 17 as product, and may be further purified as desired.

The oil and solids separated in washbox 13 are passed to a tar separator 18 wherein a heavy tar slurry, containing solids that bypassed cyclone 6, is separated in the bottom portion. Water for quenching is withdrawn from the upper portion of tank 18 by line 19 and pump 20.

The heavy tar slurry is removed from tank 18 by line 21 and passed by pump 22 and line 23 to the gasification zone. Recycling this heavy tar fraction permits a better gas yield from a given amount of oil feed. As the heavy tar contains solids, this also provides a way of disposing of them. To prevent the build-up of fines in the system, a part of the heavy tar stream containing the coke may be passed by line 24 to the burner and consumed therein.

The water from washer-cooler 15 is collected in a tar separator 25. Light tar is recovered from the bottom portion of this tar separator by line 26, either as product or as recycle feed to the reactor. If desired, a portion or all of this light tar may be passed to the burner as fuel.

While many types of burners or heating arrangements can be used to heat the circulating solids, it is much preferred to use the transfer line burner 27, illustrated, because of the short contact times favorable to maximum $CO_2$ in the flue gas that are obtainable. Burner 27 as illustrated comprises a vertically disposed, elongated, suitably refractory lined chamber wherein the solids supplied to the base by line 8 are conveyed upwardly in admixture with air or products of combustion at velocities of about 40 feet/sec. The length of the burner is such, preferably, to maintain contact times of less than 1 sec. The upper end of the transfer line discharges into a separating system 28. Flue gases are recovered from the separator by line 29, and are vented to the atmosphere after first recovering heat therefrom, if desired. The heated solids at a temperature preferably of 1700–1900° F., are passed by line 30 to the fluid bed gasification zone. In normal operation with residuum feed, the solids circulation rate will be in the order of 30 to 100 lbs./lb. of fresh feed.

It is preferred to operate the transfer line burner in conjunction with an auxiliary burner 31 wherein the air can be preheated by burning extraneous fuel. As shown, air is supplied to the system via blower 32 with a major proportion being passed from the blower by line 33 to the inlet of the transfer line burner. Primary air for the auxiliary burner is passed by line 34 to a concentrically disposed refractory chamber 35 within the burner. This concentric chamber is supplied either with extraneous fuel such as light gases by line 36, or with the heavy tar slurry from line 24. Secondary air is admitted to the auxiliary burner by line 37. Normally, about 10 to 30% of the heat required will be supplied by burning extraneous fuels or the heavy tar slurry, the remainder being obtained by combustion of the coke on the solids in transfer line 27. The density of the solids suspension in transfer line 27 is in the range of 0.2 to 2.0 lbs./cu. ft.

While the whole of the process may be operated under substantial pressure, it is preferred to operate at near atmospheric pressure. Thus, the pressure at the inlet of cyclone 6 may range from 3 to 10 p.s.i.g., and the pressure at the inlet to cyclone 28 may range from 1 to 5 p.s.i.g.

While the heat-carrying solids may themselves be catalytic, it is preferred to inject an expendable type of catalyst with the feed. For example, 0.5 to 2.0 wt. percent of a lime catalyst may be mixed or slurried with the feed via line 38.

The amount of solids entrained through bed level 5 is readily controlled by varying the level of the bed with respect to the frusto-conical portion of reactor 1. For example, the bed level 5 is raised along this portion, the area of the bed decreases, which results in an increase in the velocity of gases passing therethrough and thus, an increase in the entrainment.

*Example*

The following specific example will serve to make the invention clear. The feed stock comprises a Middle Eastern residuum having the following inspections:

| | | |
|---|---|---|
| I.P.B. | °F | 770 |
| Gravity | °A.P.I. | 13 |
| Conradson carbon | wt. percent | 12 |
| Sulfur | wt. percent | 4 |

The heat-carrying solids comprise coke produced by the process having the following characteristics:

| | | |
|---|---|---|
| True density | lb./cu. ft. | 130 |
| Settled bulk density | lb./cu. ft. | 62 |
| Carbon | wt. percent | 90 |
| Maximum size | microns | 1000 |
| Average size | do | 175 |
| Minimum size | do | 20 |

The reactor comprises a vessel with 15 ft. I.D. base, merging into a 4 ft. I.D. upper portion. The base contains 30 tons of fluidized coke having a density of 30 lbs./cu. ft. The lineal length of the upper portion to the cyclone inlet is 15 ft. Fresh feed is injected about 2 ft. above the fluid bed level. After injection of the feed, the suspension has a density of 2 lbs./cu. ft. and a velocity of 40 ft./sec. Fresh feed is injected at a rate in the range of 21,000 lbs./hr. Residence time of the vapors from the point of injection to the cyclone outlet is 0.7 second. The cyclone efficiency is 99.9%. Pressure at the cyclone outlet is 2 p.s.i.g. and temperature is 1750° F. All coke produced is consumed either by gasification or burning. 75% of the coke separated from the products is returned without cooling to the fluid bed, and the remainder is passed to the transfer line burner. 66 lbs. of steam per lb. of fresh feed is introduced into the gasification zone. 0.01 lb./lb. of fresh feed of dolomitic lime as a catalyst is introduced with the fresh feed.

The coke passed to the burner is contacted with 1.5 s.c.f./lb. of air and passed through the burner at a mass flow rate of 600 lbs./sq. ft./min., and heated to a temperature of 1900° F.

The gas recovered from the reactor cyclone is quenched to 185° F. and scrubbed, recovering 15 lbs./100 lbs. fresh feed of a heavy tar slurry comprising 10 wt. percent solids, and 5 lbs./100 lbs. of fresh feed of a light tar fraction having a gravity of 0° A.P.I. All of the light tar is recycled with the feed. 25 wt. percent of the slurry is introduced in the fluid bed, and the remainder is passed to the burner.

The product gas, after purification and sulfur removal, has the following inspections:

| | Vol. percent |
|---|---|
| $H_2$ | 50.3 |
| CO | 20.3 |
| $CO_2$ | 6.4 |
| $CH_4$ | 17.4 |
| $C_2H_6$ | 0.6 |
| Unsaturates | 5.0 |
| Sp. gr. (air≈1) | 0.483 |

Heating value, 495 B.t.u./cf. 60/30/sat.

In summary it can be seen then that the present invention proposes a new process for making low B.t.u. or town gas from petroleum fractions, particularly residuum. The oil is converted in the presence of heat-carrying solids and gasification products at an elevated temperature to coke, hydrogen, light hydrocarbons and tars. While in the reaction zone the light hydrocarbons so produced are further reformed with steam to carbon monoxide and hydrogen. The tar is recovered from the conversion products and passed to a gasification zone where the coke produced by the reaction is being gasified. Solids and gasification products are passed from the gasification zone to the hydrocarbon conversion zone.

Having described this invention, what is sought to be protected by Letters Patent is succinctly set forth in the following claims.

What is claimed is:

1. A conversion process for manufacturing a gas comprising hydrogen and carbon monoxide and having a heating value in the range of 450–550 B.t.u./cu. ft. in a single reaction zone at a rate greater than 10,000 M. s.c.f./day, which comprises maintaining in the lower portion of the reaction zone at a gasification temperature in the range of 1500–1800° F. a dense turbulent bed of fluidized solids having a defined upper level and a density 20 to 40% of the true density of said solids, continuously adding to said bed heated solids having a temperature in the range of 1700–1900° F. to maintain said gasification temperature, maintaining a total superficial fluidizing gas velocity in said bed in the range of 0.5 to 5 ft./sec. by fluidizing with steam preheated to a temperature above 250° F., injecting and converting a heavy tar in said bed, flowing vertically upwardly gasiform products along with entrained solids from said bed without appreciable cooling, injecting a heavy oil feed at a rate in the range of 0.1 to 0.4 lb./min./ft.$^3$ of said bed into said gasiform products near said upper level, flowing the resulting suspension at a velocity in the range of 25 to 60 ft./sec. and a density 5 to 15% the density of said bed to a separating zone, separating entrained solids from said gasiform products in said separating zone in less than 0.7 second from the time of injection of said heavy oil feed, returning a portion of the solids so separated to said bed, reheating the remainder to supply said heated solids, quenching said gasiform products with water to a temperature below 250° F. to remove therefrom as a slurry a heavy tar and finely divided solids, returning a portion of said slurry to said fluid bed and finally scrubbing with water the quenched gasiform products to remove light tar.

2. The process of claim 1 wherein said remainder of the solids recovered from the gasiform products is heated by burning in air in a transfer line burner.

3. The process of claim 2 wherein a portion of said slurry is injected and consumed in said transfer line burner.

4. The process of claim 1 wherein a catalyst is maintained in said reaction zone.

5. The process of claim 4 wherein said catalyst comprises an expendable material selected from the group consisting of lime, partially hydrated lime, potassium carbonate, sodium carbonate, potassium hydroxide, sodium hydroxide, and the catalyst is continuously introduced in the said reaction zone.

6. The process of claim 4 wherein said fluidized solids are catalytic and said solids comprise a catalytic material selected from the group consisting of nickel, cobalt and molybdenum.

7. A conversion process for manufacturing a gas comprising hydrogen and carbon monoxide and having a heating value in the range of above about 450 B.t.u./cu. ft. in a single reaction zone, which comprises maintaining in the lower portion of said reaction zone at a gasification temperature in the range of about 1500°–1800° F. a dense turbulent bed of fluidized solids having a defined upper level, continuously adding to said bed heated solids having a temperature in the range of about 1700°–1900° F. to maintain said gasification temperature, maintaining a total superficial fluidizing gas velocity in said bed in the range of about 0.5 to 5 ft./sec. by fluidizing with steam preheated to a temperature above about 250° F., injecting a heavy tar into said bed and converting said tar to gasiform products therein, flowing vertically upwardly gasiform products along with entrained solids from said bed without appreciable cooling, injecting a heavy oil feed into said gasiform products just above said upper level of said fluidized bed, flowing the resulting suspension at a velocity in the range of about 25 to 60 ft./sec. to a separating zone, separating entrained solids from said gasiform products in said separating zone, returning a portion of the solids so separated to said fluidized bed, reheating the remainder of said solids to supply said heated solids, quenching said gasiform products with water to a temperature below about 250° F. to remove therefrom as a slurry a heavy tar and finely divided solids, returning a portion of said slurry to said fluid bed and finally scrubbing with water the quenched gasiform products to remove a light tar.

References Cited in the file of this patent
UNITED STATES PATENTS

| | | |
|---|---|---|
| 1,868,462 | Huff | July 19, 1932 |
| 2,605,178 | Hemminger | July 29, 1952 |
| 2,605,215 | Coghlan | July 29, 1952 |
| 2,634,286 | Elliott | Apr. 7, 1953 |
| 2,657,125 | Gaucher | Oct. 27, 1953 |
| 2,775,546 | Kimberlin | Dec. 25, 1956 |